US008066386B2

United States Patent
Yoshizawa

(10) Patent No.: US 8,066,386 B2
(45) Date of Patent: Nov. 29, 2011

(54) PROJECTION IMAGE DISPLAY POSITION CONTROL DEVICE, PROJECTION IMAGE DISPLAY POSITION CONTROL METHOD, AND PROJECTION SYSTEM

(75) Inventor: Koichi Yoshizawa, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 551 days.

(21) Appl. No.: 12/252,112

(22) Filed: Oct. 15, 2008

(65) Prior Publication Data

US 2009/0141255 A1 Jun. 4, 2009

(30) Foreign Application Priority Data

Nov. 30, 2007 (JP) ................................. 2007-310009

(51) Int. Cl.
*G03B 21/14* (2006.01)
(52) U.S. Cl. .......................................... 353/70; 353/69
(58) Field of Classification Search .............. 353/30–31, 353/69–70, 122; 345/613, 694–696; 348/744–745
See application file for complete search history.

(56) References Cited

U.S. PATENT DOCUMENTS

| | | | | |
|---|---|---|---|---|
| 6,222,593 B1* | 4/2001 | Higurashi et al. | ............ | 348/745 |
| 6,456,339 B1* | 9/2002 | Surati et al. | .................. | 348/745 |
| 7,854,518 B2* | 12/2010 | Culbertson et al. | ............. | 353/69 |
| 7,857,464 B2* | 12/2010 | Saito et al. | ...................... | 353/94 |
| 2004/0239885 A1* | 12/2004 | Jaynes et al. | .................... | 353/30 |
| 2005/0018144 A1* | 1/2005 | Wada et al. | ...................... | 353/69 |
| 2005/0280780 A1* | 12/2005 | Matsumoto et al. | ............. | 353/70 |
| 2008/0284987 A1* | 11/2008 | Yonezawa | ........................ | 353/70 |
| 2009/0273719 A1* | 11/2009 | Kuwata et al. | ................. | 348/745 |

FOREIGN PATENT DOCUMENTS

JP A-08-168039 6/1996
JP 2006308830 A * 11/2006

* cited by examiner

*Primary Examiner* — Tony Ko
*Assistant Examiner* — Jori S Reilly-Diakun
(74) *Attorney, Agent, or Firm* — Oliff & Berridge, PLC

(57) ABSTRACT

A display position control device for projection image which controls a display position of a projection image displayed on a projection surface includes: a display position adjustment control unit which divides display position shift amount from a display target position of the projection image on the projection surface into a value an integer number times larger than a pixel pitch of the projection image and a value smaller than the pixel pitch; a display position control processing unit which performs display position control through image processing based on the value the integer number times larger than the pixel pitch; and a display position control mechanism which performs optical display position control based on the value smaller than the pixel pitch.

12 Claims, 5 Drawing Sheets

PROJECTION IMAGE DISPLAY POSITION CONTROL DEVICE, PROJECTION IMAGE DISPLAY POSITION CONTROL METHOD, AND PROJECTION SYSTEM

This application claims priority from Japanese Patent Application No. 2007-310009 filed in the Japanese Patent Office on Nov. 30, 2007, the entire disclosure of which is hereby incorporated by reference in its entirety.

BACKGROUND

1. Technical Field

The present invention relates to a projection image display position control device, a projection image display position control method, and a projection system.

2. Related Art

A method for performing stack projection of identical images on one screen (projection surface) by using a plurality of projectors is known. When pixels on the projection image from one of the plural (two in this case) projectors are matched with the corresponding pixels on the projection image from the other projector in the stack projection, the luminance of the projection images on the screen is substantially doubled, and thus high-luminance image display can be achieved. Moreover, when the corresponding pixels are shifted by ½ pixel in the vertical and horizontal directions, highly minute image display can be produced.

In case of the stack projection described above, however, it is not easy to accurately display the projection images from the two projectors at target display positions (display target positions) specified for each of the projection image on the screen. When the projection images from the plural projectors are not displayed at the display target positions, the image quality of the projection image deteriorates. For example, when the projection images from the two projectors are shifted by ½ pixel for highly minute projection, the advantage of highly minute projection cannot be achieved without accurate display position control for accurately shifting the respective pixels on the projection images from the projectors by ½ pixel. In this case, there is also a possibility that noise such as moiré is caused on the image which is originally free from such noise.

Various types of methods for accurately setting the display positions of the projection images from the plural projectors have been proposed (for example, see JP-A-8-168039). According to the technology disclosed in JP-A-8-168039 (hereinafter referred to as related art), the display position shift amount between the two projectors is calculated, and the display position shift amount is mechanically controlled by using a display position control mechanism. In the related art, a display position control mechanism capable of controlling the clearance between wedge-shaped transparent substrates, a display position control mechanism capable of controlling rotation angle of a flat-plate transparent substrate, a display position control mechanism capable of shifting an actuator-attached optical stage in a parallel direction, and other mechanisms are shown as examples of the display position control mechanism.

FIGS. 4A and 4B illustrate a display position control mechanism shown in the related art as an example. FIG. 4A shows an example of the display position control mechanism for clearance control between wedge-shaped transparent substrates, and FIG. 4B shows an example of the display position control mechanism for rotation angle control of a flat-plate transparent substrate.

As illustrated in FIG. 4A, the display position control mechanism for clearance control of the wedge-shaped transparent substrates can displace the optical axis of the projection image from the projector by a predetermined amount by increasing or decreasing a distance d between wedge-shaped transparent substrates 1a and 1b. In this structure, a displacement amount s of the optical axis can be arbitrarily set within a predetermined range by controlling the distance d.

As illustrated in FIG. 4B, the display position control mechanism for rotation angle control of the flat-plate transparent substrate changes a rotation angle θ of the flat-plate transparent substrate 2 to displace the optical axis of the projection image from the projector by a predetermined amount. Thus, the displacement amount s of the optical axis can be arbitrarily set within a predetermined range by controlling the rotation angle θ.

According to the display position control mechanism capable of shifting the actuator-attached optical stage in the horizontal direction which is not shown in the figure, the displacement amount of lights can be arbitrarily set within a predetermined range by shifting the actuator-attached optical stage in the horizontal direction by a predetermined amount.

According to any of the display position control mechanisms discussed above, the display position of the projection image can be controlled both in the horizontal and vertical directions.

Any types of the display position control mechanisms used in the related art described above can vary a displacement amount s of the optical axis. Thus, the display position shift amount from the display target position is not limited to an integer number times larger than the pixel pitch, i.e., the unit of 1 pixel, but may be values containing decimals such as "0.3 pixel" and "1.2 pixel". In any display position control mechanisms discussed above, however the movable range of the display position control mechanism needs to be sufficiently wide when a large shift of the display position is controlled. In this case, the size of the projector increases.

More specifically, in case of the display position control mechanism for controlling the distance between the wedge-shaped transparent substrates 1a and 1b, the distance d similarly needs to be long so as to increase the displacement amount s. For satisfying this requirement, at least the movable range of one of the two wedge-shaped transparent substrates 1a and 1b needs to be sufficiently wide. In addition, for increasing the distance d, a width L of the wedge-shaped transparent substrates 1a and 1b needs to be large.

According to the display position control mechanism for controlling the rotation angle of the flat-shaped transparent substrate 2, the rotation angle θ needs to be large so as to increase the displacement amount s. In this case, the movable range of the flat-plate transparent substrate 2 needs to be wide. In addition, an expected width L0 in the projection direction decreases as the rotation angle θ increases. Thus, a length L1 of the flat-plate transparent substrate needs to be long.

According to the display position control mechanism for shifting the actuator-attached optical stage which is not shown in the figure, the movable range of the actuator-attached optical stage needs to be sufficiently wide so as to increase the displacement amount.

Alternatively, display position control may be performed through image processing. According to the display position control method by the image processing, the necessity for the display position control mechanism is eliminated, and increase in the size of the projector is prevented. However, there is a possibility of deterioration of image quality caused by image processing.

More specifically, the display position control through image processing shifts pixels when the display position is adjusted by the unit of 1 pixel, that is, by an integer number times larger than 1 pixel. Thus, the display position control can be easily and highly accurately performed. However, the display position control through image processing is generally controlled by interpolation when the display position is adjusted by a value smaller than 1 pixel. In this case, image quality deteriorates.

For example, when a linear image A (see FIG. 5A) having a width of 1 pixel is shifted to the left in the figure by ½ pixel as illustrated in FIG. 5A, a process for displaying a linear image shifted by ½ pixel is performed by using adjoining two pixels. Thus, the linear image A originally having the width of 1 pixel is represented as a linear image A' (see FIG. 5B) having the width of two pixels, and the image quality thus deteriorates. In FIGS. 5A and 5B, each of small squares corresponds to one pixel of the optical modulation element of the projector.

SUMMARY

It is an advantage of some aspects of the invention to provide a projection image display position control device, a projection image display position control method, and a projection system capable of reducing a movable range of a display position control mechanism and achieving appropriate position control.

According to a first aspect of the invention, there is provided a display position control device for projection image which controls a display position of a projection image displayed on a projection surface and includes: a display position adjustment control unit which divides display position shift amount from a display target position of the projection image on the projection surface into a value an integer number times larger than a pixel pitch of the projection image and a value smaller than the pixel pitch; a display position control processing unit which performs display position control through image processing based on the value the integer number times larger than the pixel pitch; and a display position control mechanism which performs optical display position control based on the value smaller than the pixel pitch.

According to the display position control device for projection image having this structure, the projection image can be accurately displayed at the display target position at the time of projection of the projection image at the predetermined position on the projection screen. In this step, the display position control processing unit performs display position control an integer number times larger than the pixel pitch. Thus, pixels are shifted by the unit of pixels, and display position control is easily performed without deterioration of image quality. Also, the display position control mechanism performs display position control smaller than the pixel pitch. Thus, the movable range of the display position control mechanism is extremely decreased, and the projector can be made compact.

It is preferable that the display position control through image processing of the display position control device is performed by shifting pixels from image data corresponding to the projection image by a value an integer number times larger than the pixel pitch.

According to this structure, the display position control processing unit performs display position control by shifting pixels by a value an integer number times larger than the pixel pitch. Thus, display position control can be easily executed without deterioration of image quality.

It is preferable that the optical display position control is performed by displacing the optical axis of the projection image by the value smaller than the pixel pitch.

According to this structure, the optical display position control is performed by displacing the optical axis of the projection image by the value smaller than the pixel pitch. Thus, the movable range of the display position control mechanism can be decreased, and the projector can be made compact.

It is preferable that the projection image of the display position control device is formed by a plurality of projection images projected by plural projectors. In this case, a reference projection image of the plural projection images is set, and the display position control is performed for the projection images other than the reference projection image.

The projection system having this structure includes the plural projectors. In this projection system, a plurality of projection images are stacked on the projection surface. Examples of this stacking projection involve a projection method for performing high-luminance image display by matching corresponding pixels on the plural projection images, and a projection method for performing highly minute image display by shifting the corresponding pixels on the plural projection images by ½ pixel.

The display position control device for projection image having this structure is appropriate for display position control over stacking projection of plural projection images. Also, the display position control device for projection image having this structure is applicable to so-called tiling projection capable of forming a large-screen image by disposing a plurality of projection images on the projection surface side by side.

Moreover, the display position control device for projection image performs display position control for the projection images other than the reference projection image. Thus, display position control can be more efficiently performed than display position control performed for all of plural projection images. Furthermore, the display position control units such as the display position adjustment control unit, the display position control processing unit, and the display position control mechanism are provided only on the projector for performing display position control. Thus, the entire structure of the projection system can be simplified.

It is preferable that the display position shift amount is obtained as display position shift amount of the projection image in the horizontal and vertical directions.

According to this structure, display position control over the display position shift amount caused on the projection surface in both the horizontal and vertical directions can be performed.

According to a second aspect of the invention, there is provided a display position control method for projection image which controls a display position of a projection image displayed on a projection surface and includes: dividing display position shift amount from a display target position of the projection image on the projection surface into a value an integer number times larger than a pixel pitch of the projection image and a value smaller than the pixel pitch; performing display position control through image processing based on the value the integer number times larger than the pixel pitch; performing optical display position control based on the value smaller than the pixel pitch by displacing the optical axis of the projection image.

According to this display position control method for projection image, advantages similar to those of the display position control device for projection image according to the first aspect of the invention can be provided. It is preferable that the advantages similar to those of the display position control device for projection image according to the first aspect of the invention can be provided.

According to a third aspect of the invention, there is provided a projection system including: a projection surface; at least one projector which projects an image on the projection surface; a display position adjustment control unit which divides display position shift amount from a display target position of the projection image on the projection surface into a value an integer number times larger than a pixel pitch of the projection image and a value smaller than the pixel pitch; a display position control processing unit which performs display position control through image processing based on the value the integer number times larger than the pixel pitch; and a display position control mechanism which performs optical display position control based on the value smaller than the pixel pitch.

According to this projection system having the display position control device for projection image, advantages similar to those of the display position control device for projection image according to the first aspect of the invention can be provided. It is preferable that the advantages similar to those of the display position control device for projection image according to the first aspect of the invention can be provided.

It is preferable to further include a display position shift amount detection unit which detects the display position shift amount.

According to this display position shift detection unit has an image pickup device capable of shooting a projection image on the projection surface, and a display position shift amount calculating unit for calculating the display position shift amount based on the pickup image data outputted from the image pickup device. This display position shift amount detection unit can supply correct display position shift amount to the display position control unit.

The display position shift detection unit may further have an information input unit such as keyboard. In this case, the display position shift amount of the projection image projected on the projection surface is visually judged by the user, and the display position shift amount obtained by visual inspection is inputted through the information input unit.

BRIEF DESCRIPTION OF THE DRAWINGS

The invention will be described with reference to the accompanying drawings, wherein like numbers reference like elements.

DETAILED DESCRIPTION OF EMBODIMENTS

Embodiments according to the invention are hereinafter described.

First Embodiment

Figure 1:
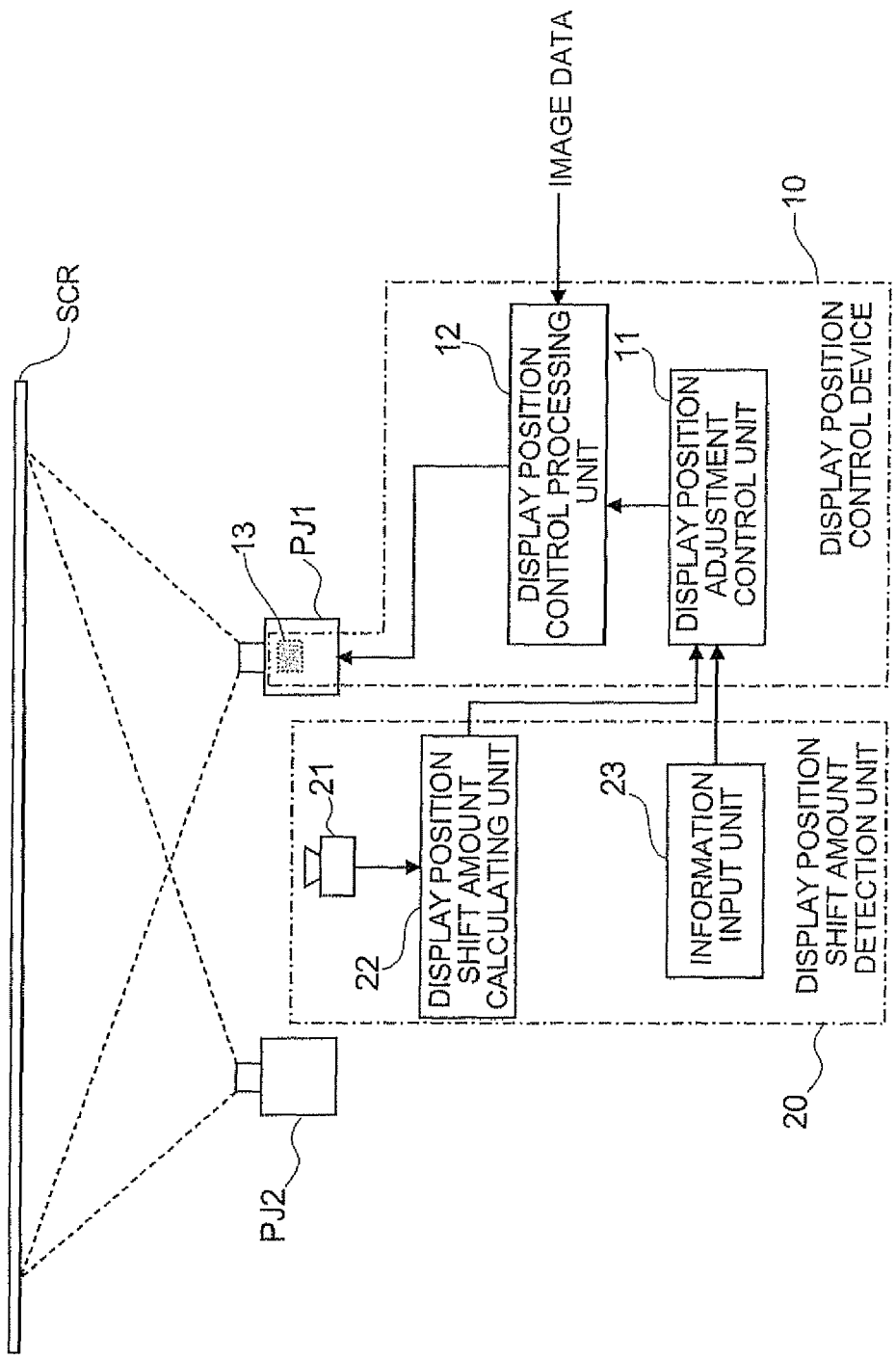
FIG. 1 illustrates a structure of a projection system according to a first embodiment.

FIG. 1 illustrates a structure of a projection system according to a first embodiment. As illustrated in FIG. 1, the projection system in the first embodiment includes two projectors PJ1 and PJ2, and a display position control device 10 and a display position shift amount detection unit 20 for detecting display position shift amount provided one of the two projectors PJ1 and PJ2. According to the projection system shown in FIG. 1, the display position control device 10 is disposed on the projector PJ1 side.

In the projection system according to the first embodiment, the two projectors PJ1 and PJ2 are so designed as to perform so-called stacking projection which overlaps respective projection images projected from the two projectors PJ1 and PJ2 on a screen SCR as a projection surface.

Examples of this stacking projection involve a projection method for performing high-luminance image display by completely matching corresponding pixels on the projection images projected from the projectors PJ1 and PJ2, and a projection method for performing highly minute image display by shifting the corresponding pixels by ½ pixel, for example, in the vertical direction and horizontal direction. In either of the methods, the display positions of the projection images from the two projectors PJ1 and PJ2 need to be controlled for appropriate setting of the display positions.

For this display position control, the display positions are adjusted such that the projection image of the projector other than the reference projector can be located at a display position specified for the projection image (display target position). According to the projection system in the first embodiment, the projection image projected from the projector PJ2 is set as the reference, and display position is controlled such that the projection image of the projector PJ1 can be located at the display target position by the function of the projector PJ1.

The display position control device 10 includes a display position adjustment control unit 11, a display position control processing unit 12, and a display position control mechanism 13. The functions and the like of the display position adjustment control unit 11, the display position control processing unit 12, and the display position control mechanism 13 will be described later.

The display position shift amount detection unit 20 includes an image pickup device 21 such as camera disposed in such a condition as to pick up a projection image projected on the screen SCR, a display position shift amount calculating unit 22 for calculating shift amount of the display position from the display target position specified for the projection image of the projector PJ1 based on pickup image data outputted from the image pickup device 21, and an information input unit 23 such as keyboard. A user can input display position shift amount through the information input unit 23. More specifically, the user judges the specific shift amount of the projection image of the projector PJ1 projected on the screen SCR from the display target position by visual inspection, and inputs the display position shift amount detected by visual inspection.

It is preferable that the detection of the display position shift amount is carried out with display position control pattern projected on the screen SCR from the projector PJ1. More specifically, when the image pickup device 22 is used, the display position control pattern projected on the screen SCR is shot by the image pickup device 22. Then, the display position shift amount calculating unit 22 calculates the display position shift amount based on the pickup image data, and supplies the calculated display position shift amount to the display position adjustment control unit 11.

In case of detection of the display position shift amount by the user's visual inspection, the display position shift amount is obtained by the user's visual inspection of the display position control pattern projected on the screen SCR, and the display position shift amount is inputted through the information input unit 23. Then, the display position shift amount inputted to the information input unit 23 is supplied to the display position adjustment control unit 11 through the information input unit 23.

The display position shift amount detection unit 20 may have both the unit of the image pickup device 21 and the display position shift amount calculating unit 22, and the information input unit 23, or may have only one of the unit 23 and the units 21 and 22.

The display position adjustment control unit 11 of the display position control device 10 has a function of obtaining the shift amount of the display position from the display target position specified for the projection image of the projector PJ1 from the display position shift detection unit 20, and dividing the obtained display position shift amount into a value of an integer number times larger than the pixel pitch and a value smaller than the pixel pitch of the projection image.

For simplifying the explanation, the display position shift amount from the display target position is normalized by the pixel pitch, and represented by a pixel value such as "1.5 pixel". This shift amount of the display position can be obtained by dividing the shift amount by the pixel pitch. For example, when the pixel pitch and the display position shift amount are 2 mm and 3 mm, respectively, the display position shift amount can be obtained as "1.5 pixel". Thus, the display position adjustment control unit 11 divides the shift amount of the display position such as "1.5 pixel" into the value as an integer number times of 1 pixel "1.0" and a value smaller than 1 pixel "0.5".

The display position control processing unit 12 has a function of shifting the display position of the projection image of the projector PJ1 projected on the screen SCR by image processing.

The display position control mechanism 13 is a mechanism capable of shifting the display position of the projector PJ1 projected on the screen SCR by displacing light (optical axis). Examples of the display position control mechanism involve a display position control mechanism for controlling the distance between the wedge-shaped transparent substances 1a and 1b, a display position control mechanism for controlling rotation angle of a flat-plate transparent substrate illustrated in FIGS. 4A and 4B, and a not-shown display position control mechanism for shifting an actuator-attached optical stage in the horizontal direction, and other various types of known display position control mechanisms.

Figure 2:
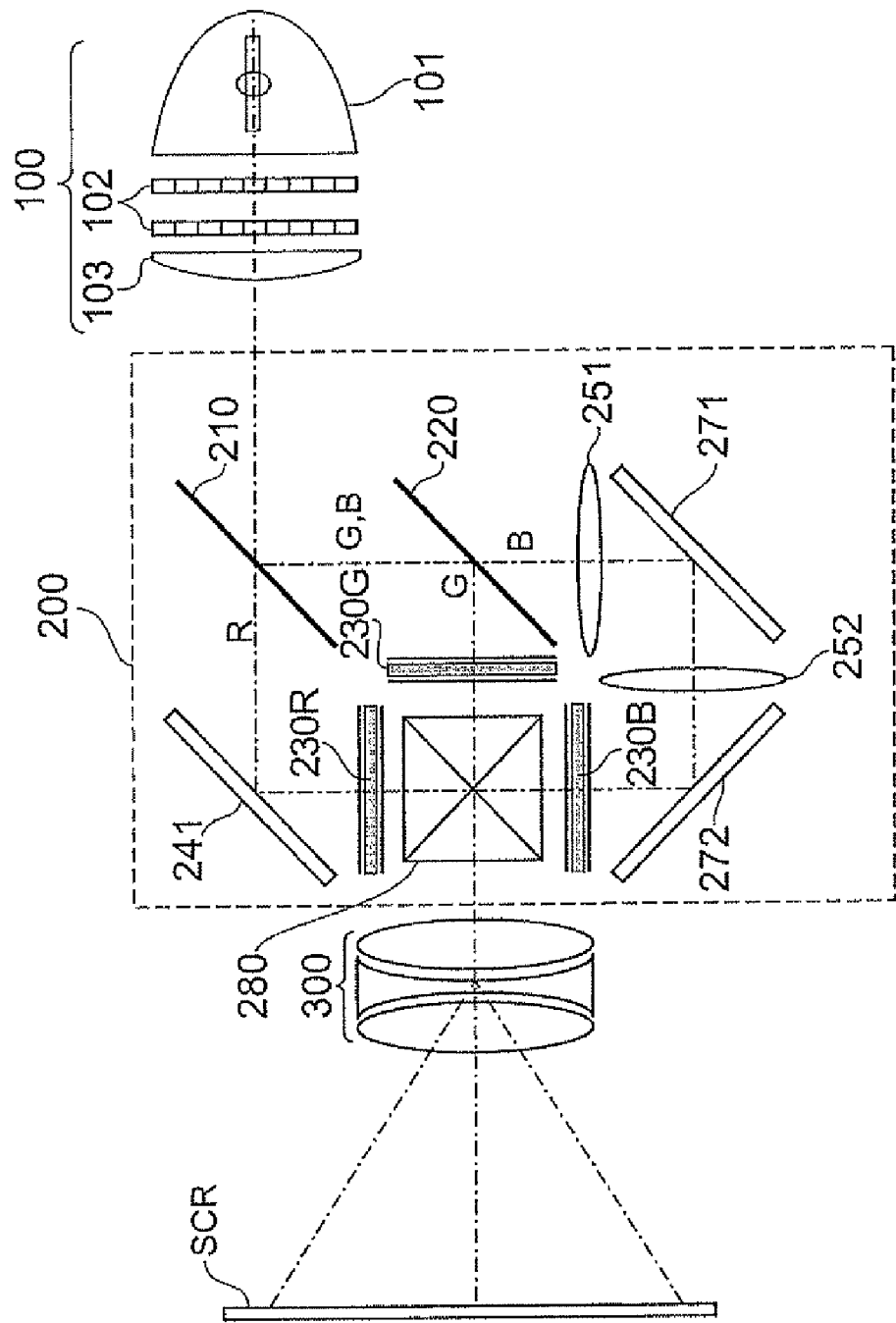
FIG. 2 schematically illustrates a structure of optical systems of a projector PJ1 shown in FIG. 1.

FIG. 2 schematically illustrates a general structure of optical systems included in the projector PJ1 shown in FIG. 1. FIG. 2 does not show the display position control mechanism 13.

As illustrated in FIG. 2, the projector PJ1 includes a light source device 100, an image forming unit 200 as an image forming device, and a projection optical system 300. The light source device 100 has a light source 101, a lens array 102, and a superimposing lens 103.

The image forming unit 200 has a first dichroic mirror 210 for dividing light emitted from the light source device 100 into red light (R), green light (G), and blue light (B), a second dichroic mirror 220 for dividing the green light (G) and the blue light (B) separated by the first dichroic mirror 210 into green light and blue light, and a light modulation element (liquid crystal panel) 230R for modulating red light, a light modulation element (liquid crystal panel) 230G for modulating green light, and a light modulation element (liquid crystal panel) 230B for modulating blue light, a reflection mirror 241 for guiding the red light passing through the first dichroic mirror 210 to the light modulation element 230R, relay lenses 251 and 252 and reflection mirrors 271 and 272 for guiding the blue light passing through the second dichroic mirror 220 to the light modulation element 230B, and a cross dichroic prism 280 for combining the lights modulated by the light modulation elements 230R, 230G, and 230B.

Figure 4A:
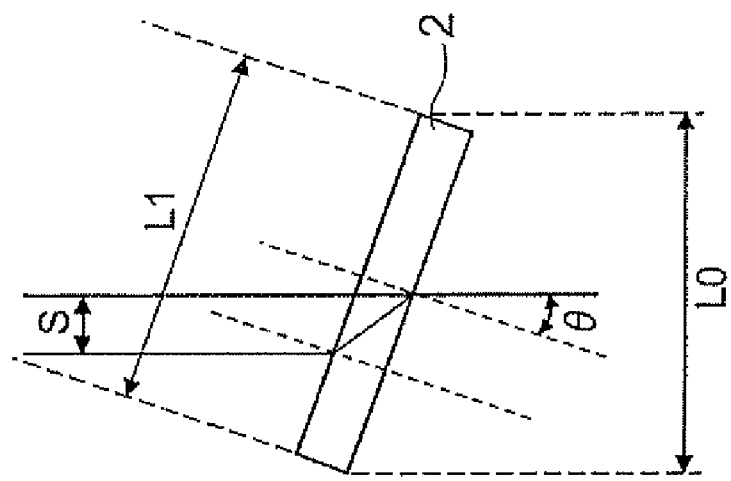
FIGS. 4A and 4B illustrate display position control mechanisms shown as examples of related art.
Figure 4B:
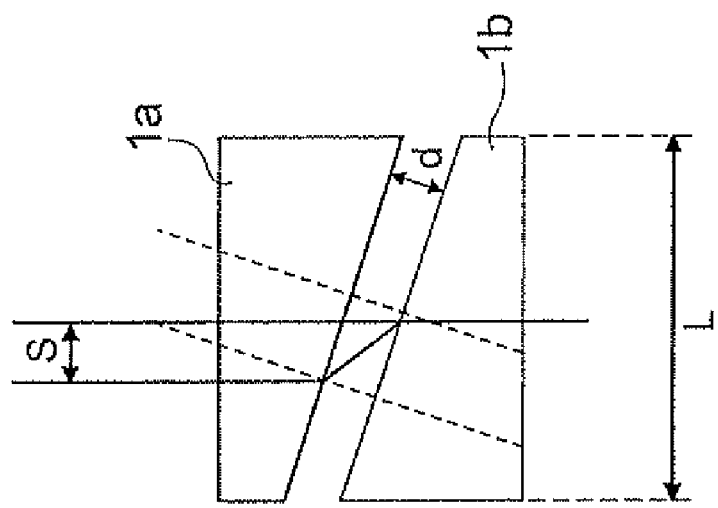

As explained above, the display position control mechanism 13 is not shown in the figure. When the display position control mechanism 13 is of the type having the wedge-shaped transparent substrates 1a and 1b or the flat-plate transparent substrate 2 shown in FIGS. 4A and 4B, for example, it is preferable that the components such as the wedge-shaped transparent substrates 1a and 1b or the flat-shaped transparent substrate 2 are disposed between the projection optical system 300 and the cross-dichroic prism 280 or similar portions. By disposing the components such as the wedge-shaped transparent substrates 1a and 1b or the flat-plate transparent substrate 2 in this position, display position control can be performed by driving the components such as the wedge-shaped transparent substrates 1a and 1b and the flat-plate transparent substrate 2 as illustrated in FIGS. 4A and 4B.

When the display position control mechanism 13 is a device which shifts an actuator-attached optical stage, the image forming unit 200 and the light source device 100 are provided on the optical stage (not shown) as one piece so that the optical stage can shift on the flat plane orthogonal to the optical axis. In this case, display position control can be performed by shifting the optical stage.

According to the structure shown in FIG. 2, the liquid crystal panel is used as the light modulation element. However, the light modulation element is not required to be constituted by liquid crystals, but may be micro-mirror-type light modulation element. The optical systems of the projector PJ2 have structures similar to those of the projector PJ1.

The function of the display position control device 10 is now described. Initially, the display position adjustment control unit 11 divides the display position shift amount into a value an integer number times larger than 1 pixel (referred to as integer part), and a value smaller than 1 pixel (referred to as decimal part). The display position shift amount supplied to the display position adjustment control unit 11 contains both the display position shift amount on the screen SCR in the horizontal direction and that in the vertical direction.

When the display position shift amount in the horizontal direction is ERRh, the display position shift amount ERRh in the horizontal direction is divided into the integer part $I_{ERRh}$ and the decimal part $F_{EERh}$. In this case, the display position shift amount ERRh in the horizontal direction is expressed as:

$$ERRh = I_{ERRh} + F_{ERRh} \tag{1}$$

Similarly, when the display position shift amount in the vertical direction is ERRv, the display position shift amount ERRv in the vertical direction is divided into the integer part $I_{ERRv}$ and the decimal part $F_{ERRv}$. In this case, the display position shift amount ERRv in the vertical direction is expressed as:

$$ERRv = I_{ERRv} + F_{ERRv} \tag{2}$$

By this method, the display position adjustment control unit 11 divides the integer part $I_{ERRh}$ and decimal part $F_{ERRh}$ of the display position shift amount in the horizontal direction, and divides the integer part $I_{ERRv}$ and decimal part $F_{ERRv}$ of the display position shift amount in the vertical direction based on the given display position shift amount. Then, the display position adjustment control unit 11 supplies the respective integer parts ($I_{ERRh}$ and $I_{ERRv}$) to the display position control processing unit 12, and the respective decimal parts ($F_{ERRh}$ and $F_{ERRv}$) to the display position control mechanism 13.

It is assumed that the display position shift amount of the projection image of the projector PJ1 in the horizontal direction is "1.5 pixel", and that the display position shift amount of the projection image in the vertical direction is "2.3 pixel". In this case, the projection image of the projector PJ1 is displayed at a position shifted from the display target position by "1.5 pixel" in the horizontal direction, and at a position shifted by "2.3 pixel" in the vertical direction from the display target position.

In this case, both the integer part "1.0 pixel" of the display position shift amount "1.5 pixel" in the horizontal direction and the integer part "2.0 pixel" of the display position shift amount "2.3 pixel" in the vertical direction are supplied to the display position control processing unit 12. Also, both the decimal part "0.5 pixel" of the display position shift amount "1.5 pixel" in the horizontal direction and the decimal part "0.3 pixel" of the display position shift amount "2.3 pixel" in the vertical direction are supplied to the display position control mechanism 13.

When the integer parts of the display position shift amount are supplied to the display position control processing unit 12 from the display position adjustment control unit 11, the display position control processing unit 12 performs display position adjustment through image processing based on the integer parts of the supplied display position shift amounts. In this case, the integer parts of the supplied display position shift amount are "1.0 pixel" in the horizontal direction and "2.0 pixel" in the vertical direction. Thus, the display position control processing unit 12 shifts the image data corresponding to the projection image by 1 pixel in the horizontal direction through image processing, and shifts the image data by two pixels in the vertical direction.

On the other hand, the decimal parts of the display position shift amount "0.5 pixel" in the horizontal direction and "0.3 pixel" in the vertical direction are supplied to the display position control mechanism 13. Thus, the display position control mechanism 13 controls the drive unit of the display control mechanism 13 such that the optical axis of the projection image displaces by 0.5 pixel in the horizontal direction, and by 0.3 pixel in the vertical direction. When the display position control mechanism 13 is a wedge-shaped transparent substrate (see FIG. 4A), the distance d between the two wedge-shaped transparent substrate 1a and 1b is controlled such that the displacement amount s of the optical axis of the projection image becomes 0.5 pixel in the horizontal direction. Similarly, the distance d between the two wedge-shaped transparent substrates 1a and 1b is controlled such that the displacement amount s of the optical axis of the projection image becomes 0.3 pixel in the vertical direction.

Thus, the display position control processing unit 12 performs integer part display position adjustment of the display position shift amount through image processing, and the display position control mechanism 13 performs decimal part display position adjustment of the display position shift amount by optical method. In this example, therefore, the projection image display position of the projector PJ1 is shifted by "1.5 pixel" in the horizontal direction, and by "2.3 pixel" in the vertical direction such that the projection image of the projector PJ1 can be located at the display target position.

Figure 5B:
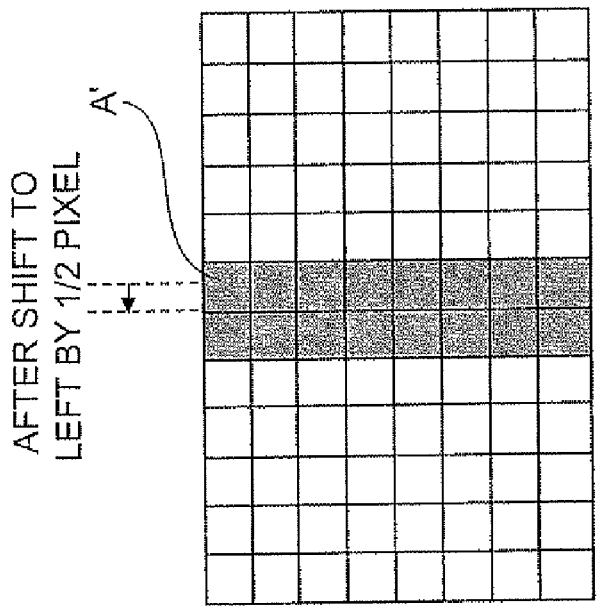
FIGS. 5A and 5B show problems caused when display position control through image processing is performed under control smaller than pixel pitch.
Figure 5A:
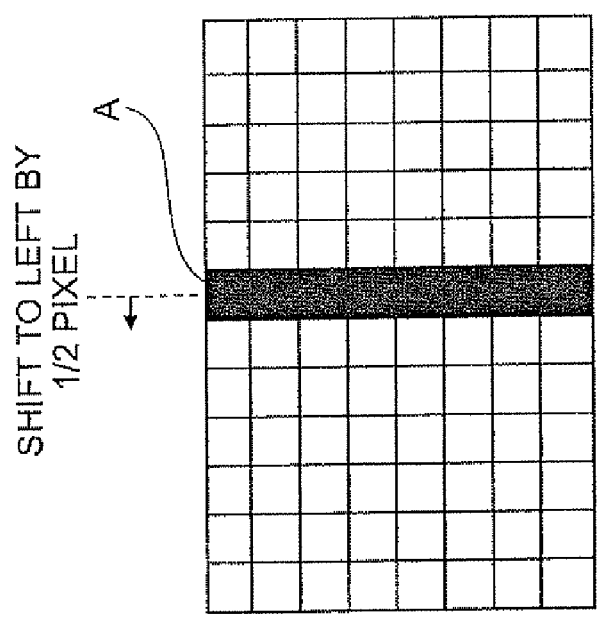

In this display position control, the display position control processing unit 12 performs only the integer part display position control. Thus, the image processing shifts pixels by the amount an integer number times larger than the pixel pitch, that is, by the unit of pixels. In this case, the position control through image processing does not cause image deterioration shown in FIGS. 5A and 5B. Also, the display position control mechanism 13 performs only decimal part display position control. Thus, the required display position control is smaller than the pixel pitch, i.e., smaller than one pixel. In this case, the movable range of the display position control mechanism 13 can be reduced, and thus the projector can be made compact.

Second Embodiment

In the first embodiment, display position control by stacking respective projection images from the two projectors on the screen SCR has been discussed. In the second embodiment, display position control of one projection image projected from one projector is explained.

Figure 3:
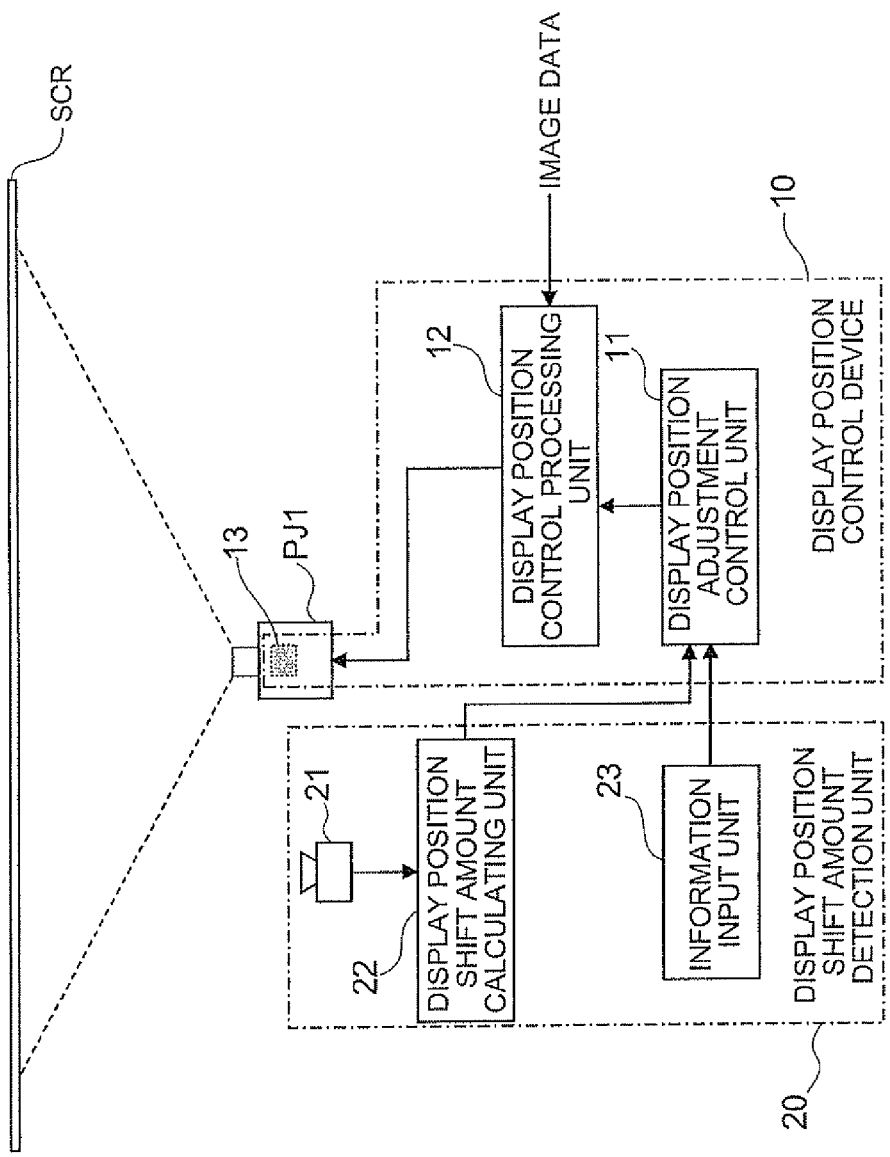
FIG. 3 illustrates a structure of a projection system according to a second embodiment.

FIG. 3 illustrates a structure of a projection system according to the second embodiment. As illustrated in FIG. 3, the projection system in the second embodiment includes one projector (projector PJ1 in this example), the display position control device 10, and the display position shift amount detection unit 20. The display position control device 10 has the display position adjustment control unit 11, the display position control processing unit 12, and the display position control mechanism 13 similarly to the projection system in the first embodiment (see FIG. 1). The display position shift amount detection unit 20 also has the image pickup device 21 such as a camera, the display position shift amount calculating unit 22, and the information input unit 23 such as keyboard similarly to the projection system in the first embodiment shown in FIG. 1.

According to the display position control of the projection system in the second embodiment, the display position shift amount from the display target position is obtained for accurate projection of one projection image at a predetermined position of the screen SCR. Then, the obtained display position shift amount is divided into the integer part and the decimal part by the display position adjustment control unit 11 in the same manner as in the first embodiment. In this case, the display position control process unit 12 controls the integer part, and the display position control mechanism 13 controls the decimal part.

Thus, the display position control processing unit 12 controls the integer part of the display position shift amount, while the display position control mechanism 13 controls the decimal part of the display position shift amount. In this case, the display position of the projection image of the projector PJ1 is shifted by a predetermined amount in the horizontal direction and vertical direction such that the projection image can be displayed at the display target position on the screen SCR. Similarly to the above example, the display position control processing unit 12 performs only the integer part display position control in this example. In this case, the pixels are shifted by the amount an integer number times larger than the pixel pitch, and thus image quality does not deteriorate. Also, the display position control mechanism 13 performs only the decimal part display position control smaller than 1 pixel. Accordingly, the movable range of the display position control mechanism can be reduced.

The invention is not limited to the embodiments described and depicted herein, and various modifications and changes may be made without departing from the scope and spirit of the invention. For example, while the projection system including two projectors has been discussed in the first embodiment, the number of the projectors may be three or more. For example, when projection images projected from three projectors are stacked, projection images from the projectors other than one reference projector can be disposed at the display target positions by performing display position control described in the first embodiment such that the projection images of the two projectors other than the reference projector are located at the display target positions.

According to the first embodiment, the example of stacking projection has been discussed. However, the projection image display position control device according to an embodiment of the invention is applicable to so-called tiling projection capable of forming a large-screen image by disposing a plurality of projection images on the projection surface side by side.

The display position adjustment control unit 11 and the display position control processing unit 12 described in these embodiments may be contained in the projector as built-in components. Alternatively, an image processing device such as a personal computer may perform the functions of these units.

According to the first embodiment, the projection images from the two projectors PJ1 and PJ2 are stacked so as to achieve high-luminance image display and highly minute image display. However, one projector may include two image forming units (image forming unit 200 shown in FIG. 2), and respective images produced by the two image forming units are combined and projected on a screen from one projection optical system. In this structure having two image forming units, display position control over respective images produced by the two image forming units can be performed in the manner similar to that of the first embodiment.

In the projector having this structure, the display position control mechanism 13 may have a mechanism capable of displacing the optical axis of image light produced by each of the two image forming units, and the display position control processing unit 12 may shift pixels on image data inputted to each of the two image forming units through image processing so as to achieve display position control similar to that in the first embodiment.

What is claimed is:

1. A display position control device which controls a display position of a projection image displayed on a projection surface, comprising:
   a display position adjustment control unit that divides a display position shift amount from a display target position of the projection image on the projection surface into a value corresponding to (i) an integer number representing one or more pixel pitches of the projection image and (ii) a value smaller than the pixel pitch;
   a display position control processing unit that performs display position control through image processing based on the value of the integer number representing one or more pixel pitches, the display position control processing unit performing display position control without interpolation; and
   a display position control mechanism that performs optical display position control based on the value smaller than the pixel pitch.

2. The display position control device according to claim 1, the display position control processing unit performs display position control through image processing being performed by shifting pixels from image data corresponding to the projection image by a value an integer number representing one or more pixel pitches.

3. The display position control device according to claim 1, the optical display position control being performed by displacing the optical axis of the projection image by the value smaller than the pixel pitch.

4. The display position control device according to claim 1, the projection image being formed by a plurality of projection images projected by plural projectors;
   a reference projection image of the plural projection images being set; and
   the display position control being performed for the projection images other than the reference projection image.

5. The display position control device according to claim 1, the display position shift amount being obtained as display position shift amount of the projection image in the horizontal and vertical directions.

6. A display position control method which controls a display position of a projection image displayed on a projection surface, comprising:
   dividing a display position shift amount from a display target position of the projection image on the projection surface into a value corresponding to (i) an integer number representing one or more pixel pitches of the projection image and (ii) a value smaller than the pixel pitch;
   performing display position control through image processing based on the value of the integer number representing one or more pixel pitches, the display position control being performed without interpolation; and
   performing optical display position control based on the value smaller than the pixel pitch.

7. A projection system, comprising:
   a projection surface;
   at least one projector that projects an image on the projection surface;
   a display position adjustment control unit that divides a display position shift amount from a display target position of the projection image on the projection surface into a value an integer number representing one or more pixel pitches of the projection image and a value smaller than the pixel pitch;
   a display position control processing unit that performs display position control through image processing based on the value the integer number representing one or more pixel pitches, the display position control processing unit performing display position control without interpolation; and
   a display position control mechanism that performs optical display position control based on the value smaller than the pixel pitch.

8. The projection system according to claim 7, further comprising a display position shift amount detection unit which detects the display position shift amount.

9. A projection system, comprising:
   a projection surface;
   a specifying unit that specifies a display position shift amount;
   a display position adjustment control unit that divides a display position shift amount from a display target position of a projection image on the projection surface into an integer component and a decimal component;
   a display position control processing unit that performs display position control through image processing based on the integer component of the display position shift amount, the display position control processing unit performing display position control without interpolation; and
   a display position control mechanism that performs optical display position control based on the decimal component of the display position shift amount.

10. The projection system according to claim 9, further comprising:

a detection unit for detecting the display position shift amount.

11. The projection system according to claim 9, further comprising:
a plurality of projectors, each of the plurality of projectors projecting an image on the projection surface, and
the display position control processing unit controlling at least one of the plurality of projectors.

12. The display position control device according to claim 1, the display control mechanism only performing optical display position control smaller than the pixel pitch.

* * * * *